US008737359B2

(12) United States Patent
Catovic et al.

(10) Patent No.: US 8,737,359 B2
(45) Date of Patent: May 27, 2014

(54) APPARATUS AND METHOD FOR FEEDBACK-BASED RADIO RESOURCE MANAGEMENT (RRM) PARAMETER OPTIMIZATION

(75) Inventors: Amer Catovic, San Diego, CA (US); Oronzo Flore, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 578 days.

(21) Appl. No.: 12/512,738

(22) Filed: Jul. 30, 2009

(65) Prior Publication Data

US 2011/0028144 A1 Feb. 3, 2011

(51) Int. Cl.
*H04W 36/00* (2009.01)
(52) U.S. Cl.
USPC .......................................... 370/332; 455/437
(58) Field of Classification Search
USPC .......... 370/230, 331, 332; 455/414, 436–439, 455/442
See application file for complete search history.

(56) References Cited

U.S. PATENT DOCUMENTS

| | | | | |
|---|---|---|---|---|
| 6,556,834 | B1 * | 4/2003 | Kobayashi et al. | 455/464 |
| 7,047,003 | B2 * | 5/2006 | Sako et al. | 455/423 |
| 7,054,631 | B2 * | 5/2006 | Tee | 455/436 |
| 2004/0248568 | A1 * | 12/2004 | Lucidarme | 455/423 |
| 2006/0227744 | A1 * | 10/2006 | Metke et al. | 370/331 |
| 2008/0032677 | A1 * | 2/2008 | Catovic et al. | 455/414.1 |
| 2008/0220784 | A1 * | 9/2008 | Somasundaram et al. | 455/437 |
| 2009/0046573 | A1 * | 2/2009 | Damnjanovic | 370/216 |
| 2010/0208707 | A1 * | 8/2010 | Hamabe et al. | 370/332 |
| 2010/0273487 | A1 * | 10/2010 | Alonso-Rubio et al. | 455/436 |
| 2011/0019532 | A1 * | 1/2011 | Jung et al. | 370/216 |
| 2011/0026492 | A1 * | 2/2011 | Frenger et al. | 370/331 |
| 2011/0183663 | A1 * | 7/2011 | Kenehan et al. | 455/423 |
| 2011/0217973 | A1 * | 9/2011 | Sagfors et al. | 455/423 |

FOREIGN PATENT DOCUMENTS

| | | |
|---|---|---|
| EP | 1641297 A1 | 3/2006 |
| WO | WO2008151325 | 12/2008 |

OTHER PUBLICATIONS

International Search Report and Written Opinion—PCT/US2010/044027, International Search Authority—European Patent Office—Feb. 9, 2011.
Mario Garcia-Lozano, et al., "Automated Up and Downlink Capacity Balancing in WCDMA Networks", Vehicular Technology Conference, 2007, VTC-2007 Fall, IEEE 66th, IEEE, PI, Sep. 1, 2007, pp. 336-340, XP031147421.

\* cited by examiner

*Primary Examiner* — Habte Mered
(74) *Attorney, Agent, or Firm* — Darren M. Simon

(57) ABSTRACT

An apparatus and method for optimizing feedback-based radio resource management (RRM) parameters comprising establishing a communication link in a serving cell within a network; performing at least one of the following: processing a plurality of measurements received to determine viability of the servicing cell and a neighboring cell, wherein the viability determination is associated with at least one RRM parameter configured by the network, analyzing an interaction between a user equipment and the network, wherein at least one RRM parameter associated with the interaction is configured by the network, or analyzing an internal procedure performed within the user equipment wherein at least one RRM parameter of the internal procedure is configured by the network; determining whether the at least one RRM parameter configured by the network should be changed; and using a transmit data processor for sending a feedback message to the network with a change recommendation.

27 Claims, 11 Drawing Sheets

APPARATUS AND METHOD FOR FEEDBACK-BASED RADIO RESOURCE MANAGEMENT (RRM) PARAMETER OPTIMIZATION

FIELD

This disclosure relates generally to apparatus and methods for radio resource management. More particularly, the disclosure relates to feedback-based radio resource management (RRM) parameter optimization for a wireless communication system.

BACKGROUND

In wireless communications, users are allocated radio resources for a variety of communication services. An important resource in a wireless system is the radio spectrum allocated over a coverage area. Since the radio spectrum is a scarce and expensive shared commodity, allocation and usage of the radio spectrum is tightly controlled by international regulatory bodies. A given wireless network is generally provided a spectrum allocation over a certain geographic area over a certain period of time. The radio spectrum allocation may involve, for example, specific frequency assignments and may require compliance with various radio regulations limiting the transmission power, antenna coverage, bandwidth utilization, spectral leakage, etc. of the provided communication services The management and control of allocated radio resources is known as Radio Resource Management (RRM). Radio resources include, for example, frequency channels, time slots, pseudo-noise (PN) codes, etc. which are allocated to wireless users to provide communication services such as voice, video, data, paging, messaging, positioning, etc. The RRM assignment process may be, for example, static (e.g., relatively fixed over a long time period) or dynamic (e.g., variable in a changing environment). In one aspect, the goal of RRM is efficient spectral utilization. For example, in a cellular communication system, spectral utilization may be measured in units of bits per second (bps) per Hz per square kilometer (bps/Hz/km$^2$). In this case, an efficient RRM process results in a relatively higher value of spectral utilization.

In a typical wireless cellular communication system which employs a plurality of cells over a coverage area, each cell comprising at least one radio transmitter, many essential RRM parameters are configurable on a cell by cell basis. However, since the quantity of cells in a typical wireless communication system may be quite numerous, for example, on the order of thousands, it is impractical for the network operator to optimize the RRM parameters individually for each cell. Moreover, each cell operates over a large range of radio propagation environments, user mobility types, services, and traffic variations. Therefore, it is difficult and impractical for the network operator to determine the optimal RRM parameters for each wireless system cell to optimize spectral utilization.

SUMMARY

Disclosed is an apparatus and method for feedback-based radio resource management (RRM) parameter optimization. According to one aspect, a method for optimizing feedback-based radio resource management (RRM) parameters comprising acquiring a second communication link with a second signal strength from a second base station that is greater than a first signal strength from a first base station, after experiencing a radio link failure (RLF) and losing a first communication link with the first base station; analyzing the cause of the radio link failure (RLF); and a user equipment re-optimizing the RRM parameters based on the cause of the radio link failure (RLF).

According to another aspect, a user equipment comprising a processor and a memory, the memory containing program code executable by the processor for performing the following: acquiring a second communication link with a second signal strength from a second base station that is greater than a first signal strength from a first base station, after experiencing a radio link failure (RLF) and losing a first communication link with the first base station; analyzing the cause of the radio link failure (RLF); and re-optimizing the RRM parameters based on the cause of the radio link failure (RLF).

According to another aspect, a computer-readable medium having a computer program comprising instructions, which when executed by at least one processor, operates to optimize feedback-based radio resource management (RRM) parameters, the computer program comprising instructions for acquiring a second communication link with a second signal strength from a second base station that is greater than a first signal strength from a first base station, after experiencing a radio link failure (RLF) and losing a first communication link with the first base station; instructions for analyzing the cause of the radio link failure (RLF); and instructions for re-optimizing the RRM parameters based on the cause of the radio link failure (RLF).

According to another aspect, a method for optimizing feedback-based radio resource management (RRM) parameters comprising establishing a communication link in a serving cell within a network; performing at least one of the following three steps: a) processing a plurality of measurements received to determine viability of the servicing cell and a neighboring cell, wherein the viability determination is associated with at least one RRM parameter configured by the network; b) analyzing an interaction between a user equipment and the network, wherein at least one RRM parameter associated with the interaction is configured by the network; or c) analyzing an internal procedure performed within the user equipment wherein at least one RRM parameter of the internal procedure is configured by the network; determining whether the at least one RRM parameter configured by the network should be changed; and using a transmit data processor for sending a feedback message to the network with a change recommendation for the at least one RRM parameter.

According to another aspect, a user equipment for optimizing feedback-based radio resource management (RRM) parameters comprising a processor; a memory containing program code executable by the processor for performing the following: 1) establishing a communication link in a serving cell within a network; 2) performing at least one of the following three steps: a) processing a plurality of measurements received to determine viability of the servicing cell and a neighboring cell, wherein the viability determination is associated with at least one parameter configured by the network; b) analyzing an interaction between the user equipment and the network, wherein at least one RRM parameter associated with the interaction is configured by the network; or c) analyzing an internal procedure performed within the user equipment wherein at least one RRM parameter of the internal procedure is configured by the network; 3) determining whether the at least one RRM parameter configured by the network should be changed; and a transmit data processor for sending a feedback message to the network with a change recommendation for the at least one RRM parameter.

According to another aspect, a computer-readable medium having a computer program comprising instructions, which when executed by at least one processor, operates to optimize feedback-based radio resource management (RRM) parameters, the computer program comprising instructions for establishing a communication link in a serving cell within a network; instructions for performing at least one of the following three steps: a) processing a plurality of measurements received to determine viability of the servicing cell and a neighboring cell, wherein the viability determination is associated with at least one RRM parameter configured by the network; b) analyzing an interaction between a user equipment and the network, wherein at least one RRM parameter associated with the interaction is configured by the network; or c) analyzing an internal procedure performed within the user equipment wherein at least one RRM parameter of the internal procedure is configured by the network; instructions for determining whether the at least one RRM parameter configured by the network should be changed; and instructions for sending a feedback message to the network with a change recommendation for the at least one RRM parameter.

Advantages of the present disclosure include improved performance and optimized user experience. Advantages also include allowing adjustment to a mixture of services, user mobility types and RF conditions in the cell as well as self optimization of such parameters, and customizing parameter settings to take advantage of the cell-level parameter configurability.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
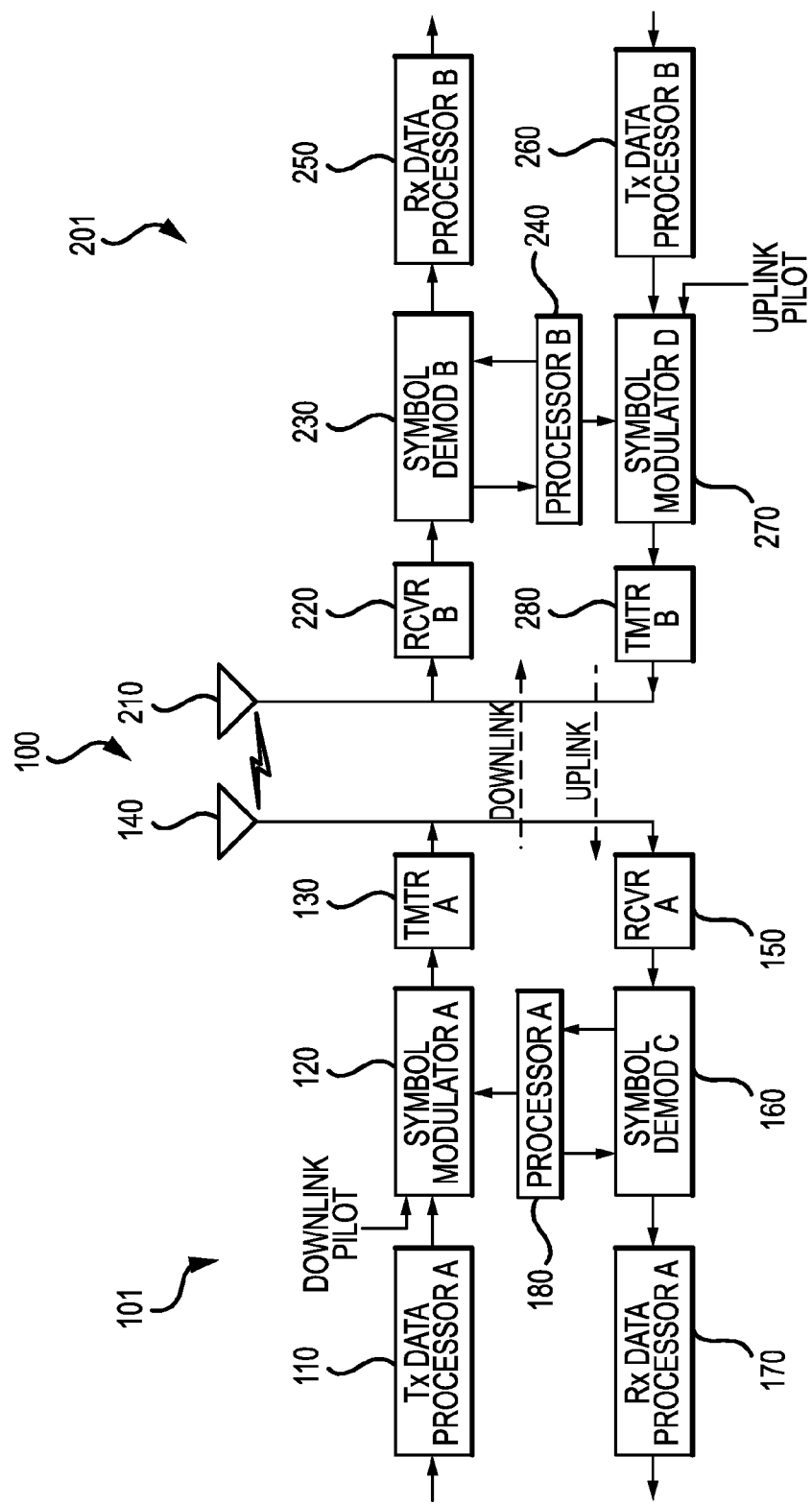
FIG. 1 is a block diagram illustrating an example access node/UE system.

FIG. 1 is a block diagram illustrating an example access node/UE system 100. One skilled in the art would understand that the example access node/UE system 100 illustrated in FIG. 1 may be implemented in an FDMA environment, an OFDMA environment, a CDMA environment, a WCDMA environment, a TDMA environment, a SDMA environment or any other suitable wireless environment.

The access node/UE system 100 includes an access node 101 (a.k.a. base station) and a user equipment or UE 201 (a.k.a. wireless communication device). In the downlink leg, the access node 101 (a.k.a. base station) includes a transmit (TX) data processor A 110 that accepts, formats, codes, interleaves and modulates (or symbol maps) traffic data and provides modulation symbols (a.k.a. data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (a.k.a. data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (a.k.a. base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., FDMA, OFDMA, CDMA, TDMA, SDMA, etc.), multiple terminals transmit concurrently on the uplink leg. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
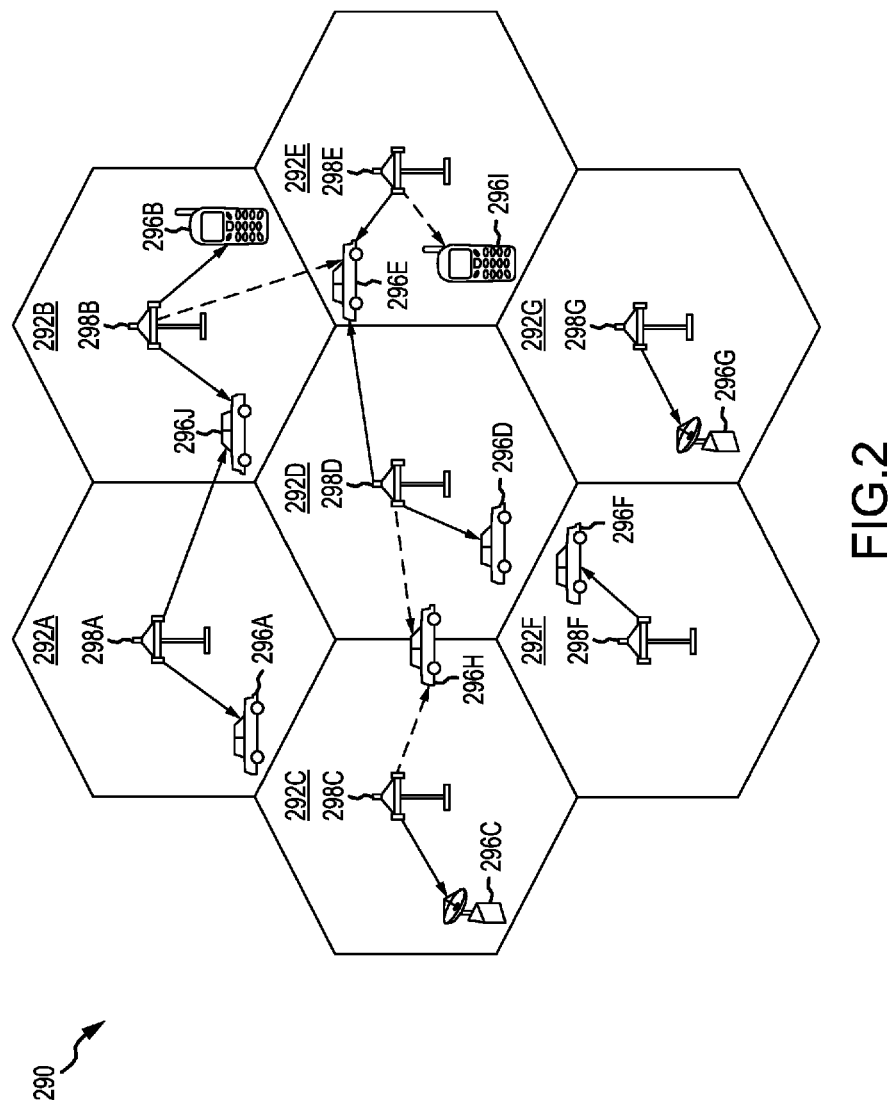
FIG. 2 illustrates an example of a wireless communications system that supports a plurality of users.

FIG. 2 illustrates an example of a wireless communications system 290 that supports a plurality of users. In FIG. 2, reference numerals 292A to 292G refer to cells, reference numerals 298A to 298G refer to base stations (BS) or base transceiver station (BTS) and reference numerals 296A to 296J refer to access User Equipments (UE). Cell size may vary. Any of a variety of algorithms and methods may be used to schedule transmissions in system 290. System 290 provides communication for a number of cells 292A through 292G, each of which is serviced by a corresponding base station 298A through 298G, respectively.

In typical wireless network operation, the radio resource management (RRM) parameter settings are based on network infrastructure vendor recommendations. And, typically, RRM parameters are made static, for example, only manually changeable.

Conventional wireless network operation is not optimal since RRM parameter settings are typically not optimized for each cell and are not based on any feedback from wireless devices regarding the parameter settings. Typically, wireless network access nodes or base stations broadcast parameter settings, for example, cell reselection parameters, access parameters etc., or send parameter settings using dedicated Radio Resource Control (RRC) signaling, for example, Handover parameters, to the wireless devices or user equipment (UE).

Typically, most RRM parameters are configured to identical values across large number of cells, sometimes throughout the entire network i.e., for all cells. For some RRM parameters, several different settings may be applied across the network depending on the type of cell, whereby the type of cell may be determined based on the location or type of radio environment in the cell. For example, parameters for inter radio access technology handover (IRAT HO) for cells located within the core coverage area may be differently configured from the cells at the edge of the coverage area.

In the present disclosure, to improve wireless network operation, a wireless device determines the desired RRM parameter setting for that device and provides feedback to the network, for example, a radio network controller (RNC). For example, the wireless device can use internal or proprietary algorithms to determine the preferred RRM parameter settings and report the preferred RRM parameter settings back to the radio network controller (RNC) using a communication protocol. One example of the communication protocol is the radio resource protocol (RRC). In this case, the RNC optimizes the RRM parameter setting for that particular cell based on the feedback received from the wireless devices in that cell. The end result is that cell-specific RRM parameter settings are provided for the best average user satisfaction within the wireless network policies, for example, user prioritization, service prioritization, etc.

In one usage, RRM parameter setting feedback is used for intra-frequency handover parameter setting in the wireless network. For example, the radio resource control (RRC) protocol specifications for Wideband Code Division Multiple Access (WCDMA) based UTRAN (Universal Terrestrial Radio Access Network) TS 25.331 and Long Term Evolution (LTE) based E-UTRAN (Evolved Universal Terrestrial Radio Access Network) TS 36.331 define the following intra-frequency connected mode measurement reporting events used for handover triggering:

Event 1a (UTRAN): a primary CPICH (common pilot channel) enters the Reporting Range Event a3 (E-UTRAN): Neighbor cell becomes better than serving cell.

These events are configured in the MEASUREMENT CONTROL RRC downlink message using a number of parameters which include:

Hysteresis
Time-to-trigger (TTT)
Reporting Range (UTRAN only)

The setting of these parameters determines the handover dynamics. For example, triggering too early handovers may cause "ping-pongs" and radio link failure (RLF) in the target cell. And, triggering too late handovers may cause a RLF in the source cell. Thus, appropriate settings of the RRM parameters should be based on the dynamics of the radio environment and mobility pattern of the majority of cell users.

In one aspect, the user equipment (UE) computes the optimum event 1a/a3 parameter setting for its own RF conditions and mobility in each cell it traverses. The UE internally analyzes the causes of the past RLF events, and for all RLFs caused by inappropriate event 1a/a3 parameter settings, determines the setting that reduces the RLF probability in the future. The UE then provides feedback of the parameter settings to the, for example, radio network controller in UTRAN or to evolved NodeB (eNB) in an E-UTRAN. In one example, the RNC in UTRAN and eNB in E-UTRAN collects the RRM parameter feedback from all UEs and adjusts the setting of the event 1a/a3 parameters for each cell. Additional inputs to the parameter adjustment algorithm may include, for example, service type (e.g. give more weight to the feedback of voice users), RAB (radio access bearer) type (e.g. streaming bearers carry more weight than background bearers), time of day/time of week or network resource availability, etc. One skilled in the art would understand that the example inputs to the parameter adjustment algorithm are not exclusive and that other inputs may be included without affecting the scope and spirit of the present disclosure.

Figure 3:
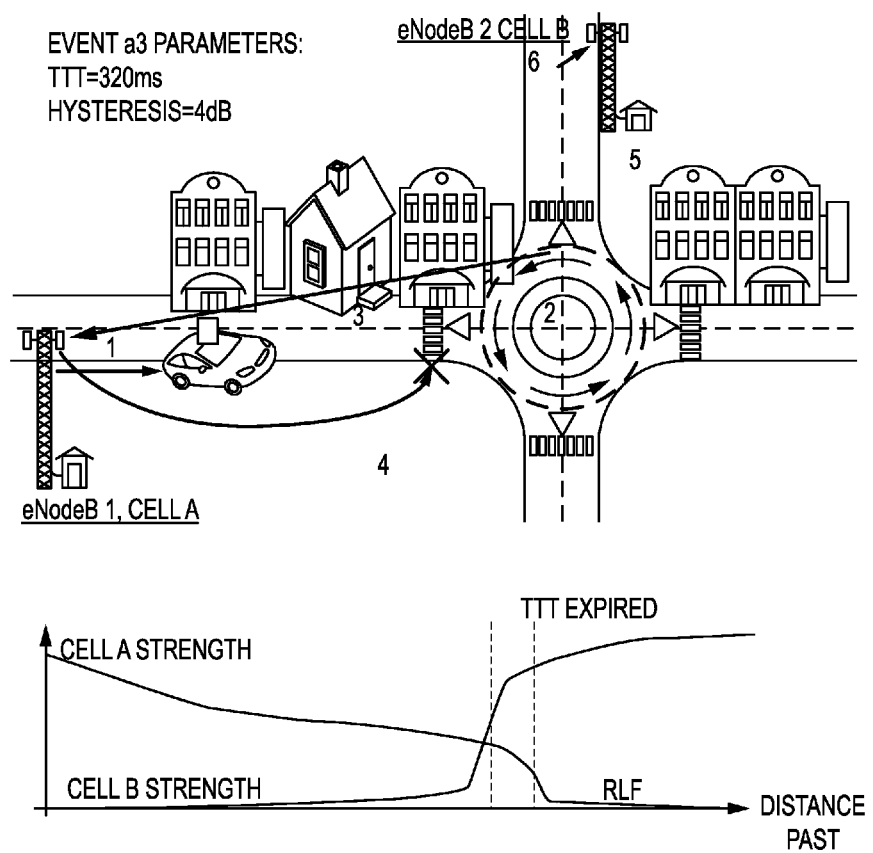
FIG. 3 illustrates a first example of an event a3 parameter setting in E-UTRAN.

FIG. 3 illustrates a first example of an event a3 parameter setting in E-UTRAN. In an initial step (step 0), the UE starts a call with a first base station (e.g. eNodeB#1) at Cell A. In step 1, the first base station (e.g. eNodeB#1) sends a MEASUREMENT CONTROL message with information element (IE) "Intra-frequency measurement reporting criteria" for event a3 with particular TTT and hysteresis values, for example, TTT=320 ms and hysteresis=4 dB for Cell A. In step 2, the UE receives a strong signal from a second base station (e.g. eNodeB#2) at Cell B. In an example, the signal from Cell B is at least 2 dB (corresponding to half of the hysteresis value) higher than the signal from Cell A. According to the specifications, the UE starts the TTT timer. In step 3 the TTT timer expires and the UE sends a MEASUREMENT REPORT message reporting the event a3, according to the specifications, thereby signaling the need for a handover to the first base station (eNodeB#1). In step 4, the first base station sends a HANDOVER COMMAND message to the UE to handover to the second base station at Cell B. However, the UE does not receive the HANDOVER COMMAND message due to the lack of the deteriorated quality of coverage from Cell A. In step 5, the UE loses synchronization with Cell A and reaches a Radio Link Failure (RLF) state. In step 6, the UE acquires Cell B and sends a radio resource controller (RRC) Connection Re-establishment message, performs internal analysis on the RLF, and determines that the cause is a conservative setting of event a3 parameters. UE determines that a more aggressive setting, that is decreasing the time-to-trigger (TTT) and hysteresis values (e.g. TTT=100 ms and hysteresis=0 dB), would reduce the RLF probability in this location.

Figure 4:
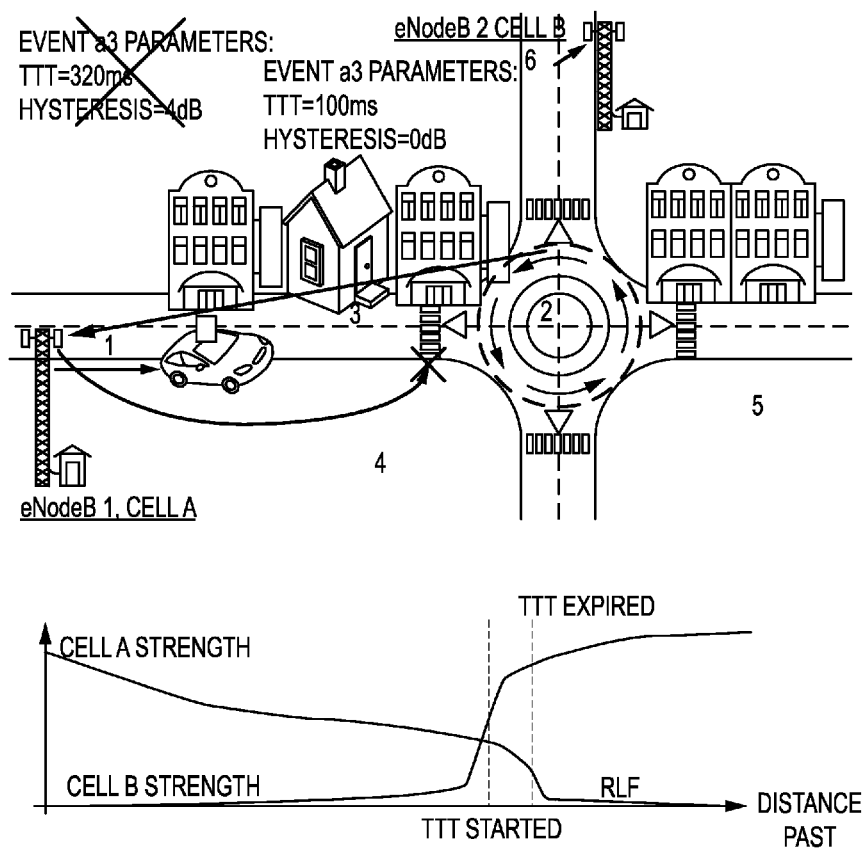
FIG. 4 illustrates a second example of an event a3 parameter setting in E-UTRAN.

FIG. 4 illustrates a second example of an event a3 parameter setting in E-UTRAN. In an initial step (step 0), the UE starts a call with a first base station (e.g. eNodeB#1) at Cell A. In step 1, the first base station (e.g. eNodeB#1) sends a MEASUREMENT CONTROL message with information element (IE) "Intra-frequency measurement reporting criteria" for event a3 with particular TTT and hysteresis values, for example, TTT=320 ms and hysteresis=4 dB for Cell A. In step 2, the UE receives a strong signal from a second base station (e.g. eNodeB#2) at Cell B. In an example, the signal from Cell B is at least 2 dB higher than the signal from Cell A. The UE starts the TTT timer. In step 3 the TTT timer expires and the UE sends a MEASUREMENT REPORT message reporting the event a3. The UE includes the feedback IE "Intra-frequency measurement reporting criteria" for event a3 with more aggressive event a3 parameter settings, for example with TTT=100 ms and hysteresis=0 dB. The first base station receives the same or similar feedback for more aggressive event a3 parameter settings from other UEs. The first base station then adjusts the parameter settings for event a3 to more aggressive values, for example, TTT=100 ms and hysteresis=0 dB. In step 4, the first base station sends a HANDOVER COMMAND message to the UE to handover to the second base station at Cell B. However, the UE does not receive this message due to the lack of coverage from Cell A. In step 5, the UE loses synchronization with Cell A and reaches a Radio Link Failure (RLF) state. In step A6, the UE acquires Cell B and sends a radio resource controller (RRC) Connection Re-establishment message and performs internal analysis on the RLF.

Figure 5:
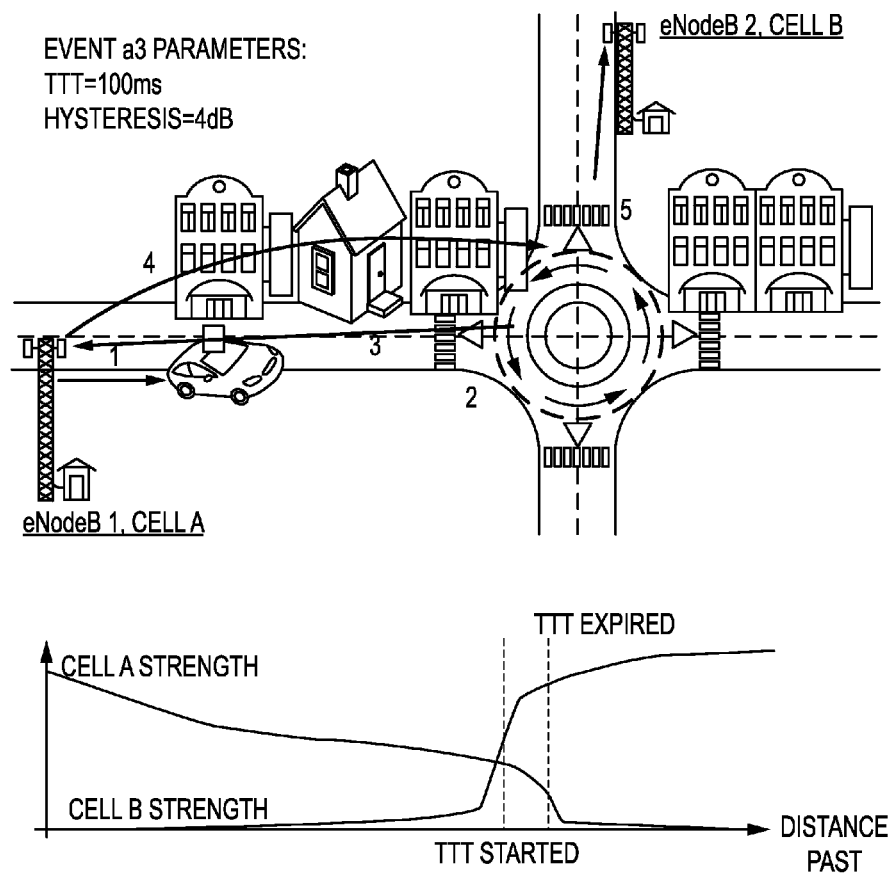
FIG. 5 illustrates a third example of an event a3 parameter setting in E-UTRAN.

FIG. 5 illustrates a third example of an event a3 parameter setting in E-UTRAN. In an initial step (step 0), the UE starts a call with a first base station (e.g. eNodeB#1) at Cell A. In step 1, a first base station (e.g. eNodeB#1) sends a MEASUREMENT CONTROL message with information element (IE) "Intra-frequency measurement reporting criteria" for event a3 with particular TTT and hysteresis values, for example, TTT=100 ms and hysteresis=0 dB for Cell A. In step 2, the UE receives a strong signal from a second base station (e.g. eNodeB#2) at Cell B such that the signal from Cell B is higher than that of Cell A. The UE starts the TTT timer. In step 3 the TTT timer expires and the UE sends a MEASUREMENT REPORT message reporting the event a3. In step 4, the first base station sends a HANDOVER COMMAND message to the UE to handover to the second base station at Cell B. In step 5, the UE acquires Cell B and sends a HANDOVER CONFIRM message to Cell B.

In one example, the UE monitors its transmit power level at the last preamble transmission in the last preamble cycle. And, if the transmit power is less than the maximum, the UE has the option to ask for a larger preamble count and/or larger power increments. If transmit power level is at its maximum before the last preamble, the UE has the option to ask for smaller power increments and/or a smaller preamble count.

In one example, the UE provides feedback on the timer for reselection to a new cell (e.g., "T_reselection" parameter specified in 3GPP TS 25.331 for UTRAN and in TS 36.331 for E-UTRAN) and provides feedback on the "cell individual offset" parameter specified in 3GPP TS 25.331 for UTRAN and in TS 36.331 for E-UTRAN to obtain the optimal tradeoff between the number of reselection ping-pongs, location area update (LAU), routing area update (RAU), battery life and/or serving cell quality, etc.

In another example, parameters controlling the period between retransmissions ("T300" parameter specified in 3GPP TS 25.331 for UTRAN and in TS 36.331 for E-UTRAN) and the maximum allowed number of retransmissions of the RRC Connection Request message ("N300" parameter specified in 3GPP TS 25.331 for UTRAN and in TS 36.331 for E-UTRAN) are optimized using RRM parameter feedback.

In one aspect, feedback from the UE is sent to the wireless network in several alternate ways. For example, the UE uses the RRC protocol to send a MEASUREMENT REPORT message to the radio network controller (RNC) or e-Node B. Alternatively, the UE uses higher layer protocol messages to send to the core network to provide feedback on RRM parameter settings. For example, the higher layer message is at the application layer or is a dedicated radio access bearer (RAB) signal for network self-optimization.

In one aspect, feedback from the UE is sent to the wireless network during the next visit to the cell to which the feedback pertains. And, in one aspect, the feedback is sent to the network as soon as available. And, in yet another aspect, the feedback is sent as soon as the connection to the network is re-established to the cell at which the connection is re-established. And, in yet another aspect, feedback can be sent periodically, in time intervals configured by the network. And, in yet another network, the feedback can be sent when requested by the network. Dedicated feedback report messages are introduced in the RRC which can, for example, be sent during off-peak hours at little or no user cost.

There are several options for the format of the RRM parameter feedback for the UE to specify its desired parameter settings. In one example, the feedback is formatted using the same RRC information element (IE) as used for parameter configuration. For example, in 3GPP intra-frequency handover parameter optimization, the IE for "intra-frequency measurement reporting criteria" is reused for the parameter feedback, which would not require standardizing a new IE for this purpose. In another example, the UE adds extra information in the parameter feedback such as the time of day, location of the failures that triggered the feedback, etc. And, this option would require defining new IEs. In one example, feedback from the UE is sent to the wireless network appended to one of the existing messages sent by the UE to the network. In another example, feedback from the UE is sent in messages dedicated to feedback reporting.

In one aspect, the RRM parameter feedback information is sent to the automatic RRM parameter optimization functionality in the wireless network. For example, this functionality could reside in the following locations in a 3GPP wireless system:
RNC/eNodeB
Network Element Manager
Domain Manager
Network Manager
Self-Organizing Network (SON) server One skilled in the art would understand that the example locations where the functionality resides are not exclusive and that other examples are available without affecting the spirit or scope of the present disclosure.

Additionally, in one example, the functionality processes feedback from all UEs related to the parameters of a given network area and optionally produces updated parameter settings for that network area. In one example, the network area consists of one cell.

Figure 6:
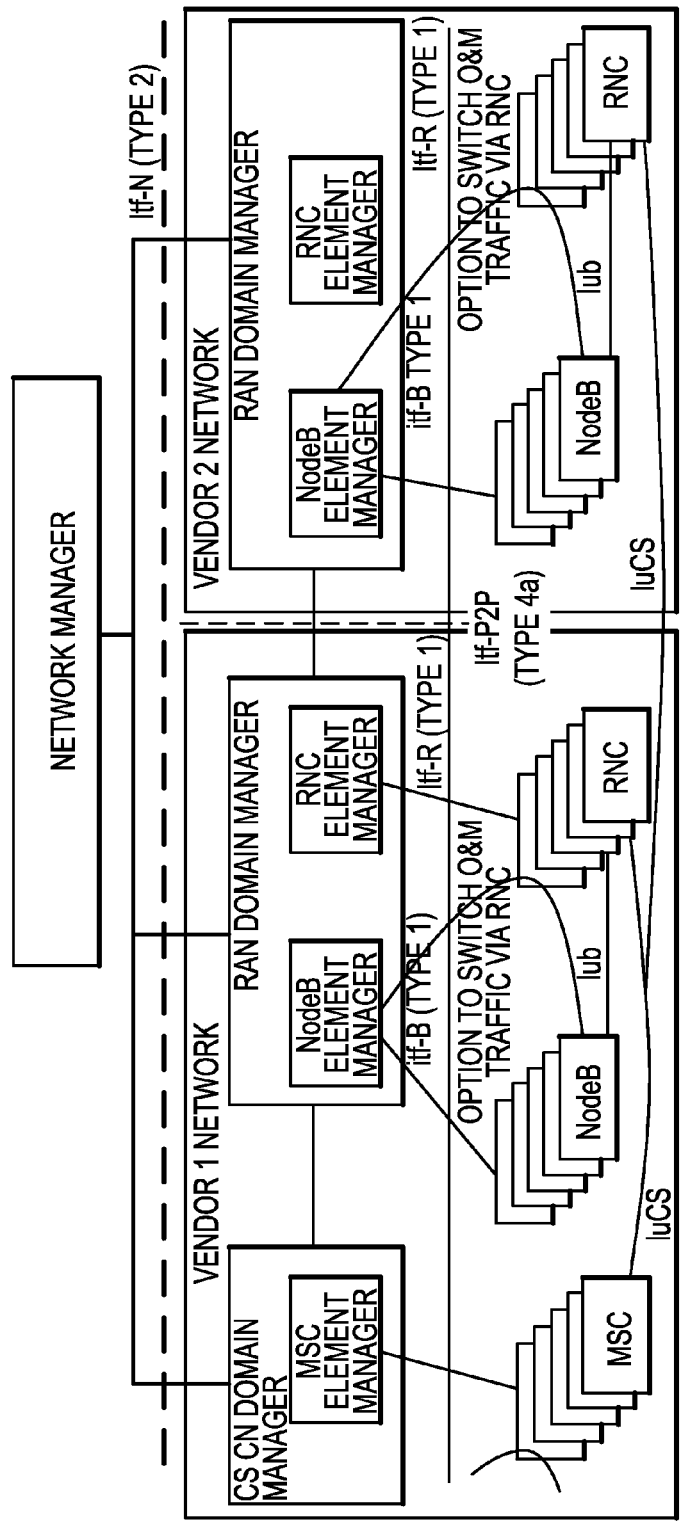
FIG. 6 illustrates an example operations and management (OAM) system for a UMTS (Universal Mobile Telecommunications System) wireless network.

FIG. 6 illustrates an example operations and management (OAM) system for a UMTS (Universal Mobile Telecommunications System) wireless network. As illustrated in FIG. 6, two vendor networks are under the supervision of an overall Network Manager, where the first network is a dual mode network with separate CN and RAN domain managers and the second network is a third generation (3G) network with a single RAN domain manager. Access to the 3G network is through the NodeB (base station) elements.

Figure 7A:
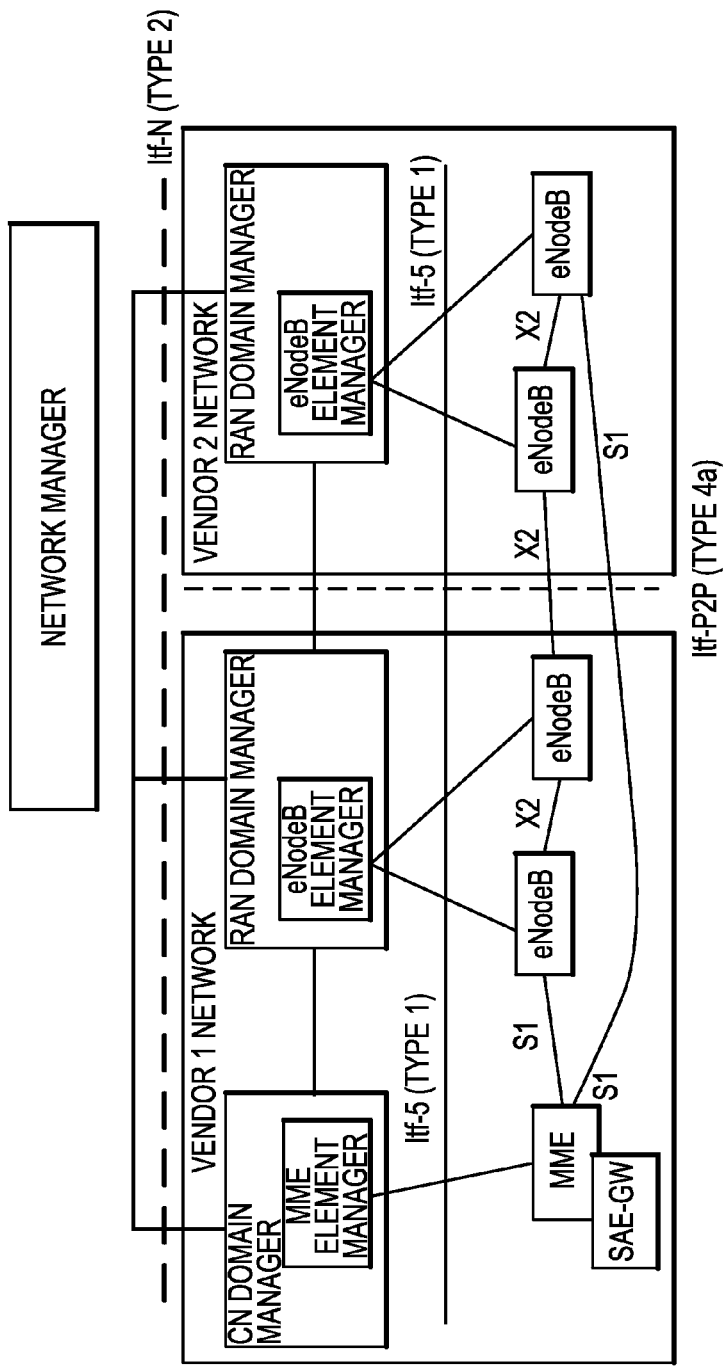
FIG. 7a illustrates an example OAM system for a LTE (Long Term Evolution) wireless network.

FIG. 7a illustrates an example OAM system for a LTE (Long Term Evolution) wireless network. As illustrated in FIG. 7a, two vendor networks are under the supervision of an overall Network Manager, where the first network is a dual mode network with separate CN and RAN domain managers, and the second network is a fourth generation (4G) network with a single RAN domain manager. Access to the 4G network is through the eNodeB (base station) elements.

In another aspect, the automatic RRM parameter optimization functionality weighs the feedback based on the service provided. For example, priority could be given to voice users over other users. In another example, feedback-based parameter optimization is enabled only for a selected parameter subset. Or, the selected parameter subset is advertised to UEs during the connection setup phase.

Providing network with the RRM parameter feedback by mobile devices has several advantages over current RRM parameter configuration practice which may include:

Dynamic characteristic—the process adjusts to the service mix, user mobility types, and cell radio conditions Localized characteristic—the process allows each cell to have custom parameter settings to take advantage of the cell-level parameter configurability Self-optimization—the process minimizes human intervention, except for parameter or algorithmic optimization Optimized user experience—the process allows the UE algorithms to suggest parameter settings to avoid past failures such as call dropouts, poor throughput, etc.

As disclosed, using RRM parameter feedback can improve overall performance in the wireless network in terms of fewer dropped calls, higher data throughput, fewer access failures, etc. One skilled in the art would understand that the advantages listed are not exclusive and that other advantages may also be available.

Figure 7B:
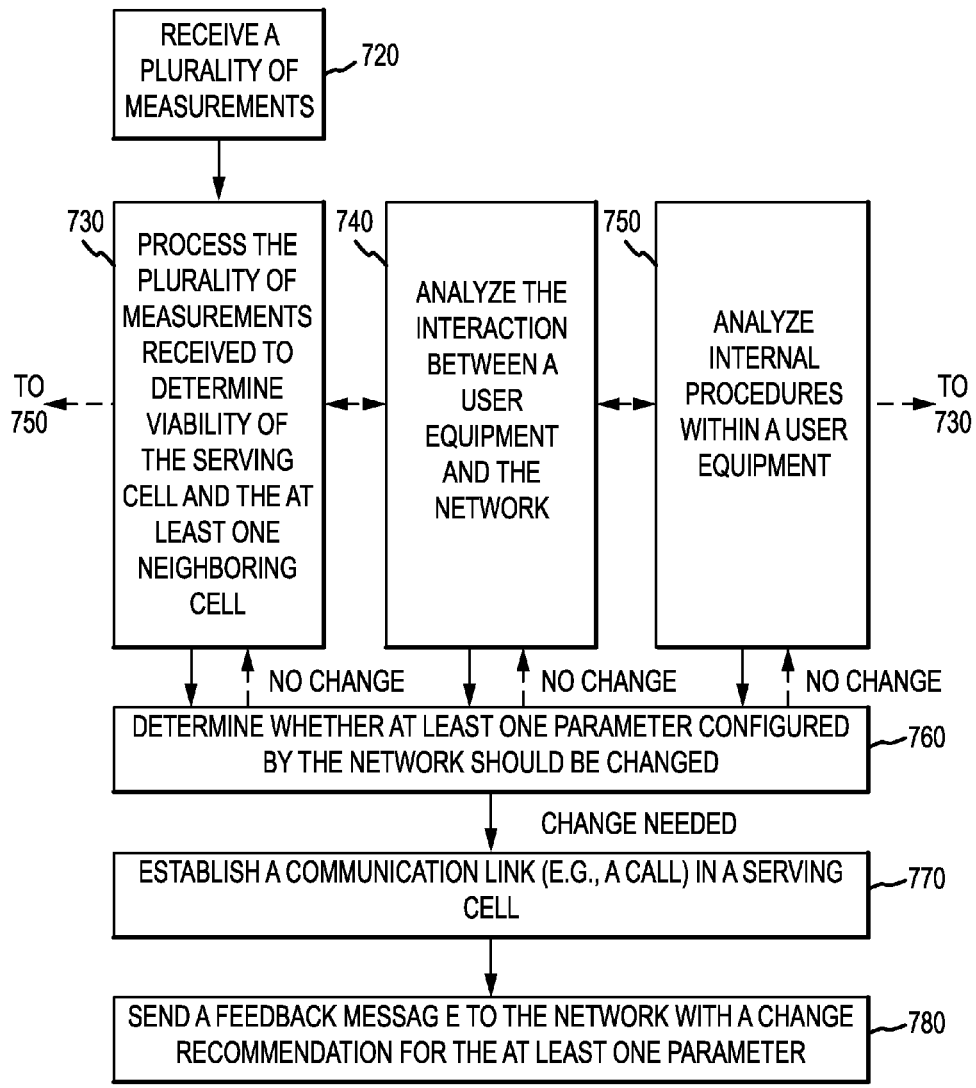
FIG. 7b is an example flow diagram optimizing feedback-based radio resource management (RRM) parameters.

FIG. 7b is an example flow diagram optimizing feedback-based radio resource management (RRM) parameters. In block 720, receive a plurality of measurements. In one aspect, the plurality of measurements includes at least one measurement emanating from the serving cell and at least one measurement emanating from at least one neighboring cell. The neighboring cell is different from the serving cell but is within a same network as the serving cell. In one aspect, the plurality of measurements comprises of signal strengths of the serving cell and the at least one neighboring cell. Following block 720, in block 730, process the plurality of measurements received to determine viability of the servicing cell and a neighboring cell. In one example, the plurality of measurements is signal strength. The viability determination is associated with at least one parameter configured by the network. Based on the viability of the serving cell and the neighboring cell, an event based on the at least one parameter configured by the network may be triggered. For example, if the viability of the neighboring cell surpasses a threshold value (i.e., parameter configured by the network) while the viability of the serving cell is below the threshold value, a handover event may be triggered (i.e., the user equipment may request a handover to the neighboring cell). In one example, the steps of blocks 720 through 730 are performed by a user equipment.

In block 740, analyze the interaction between a user equipment and the network, wherein at least one parameter associated with the interaction is configured by the network. In one example, the user equipment reports to the network a handover triggering event, and the network processes the triggering event and negotiates with a target cell for handover. If the negotiation is successful, the network then sends a message for handover to the user equipment. However, the message for handover may not be received in time to save the user equipment from experiencing radio link failure (RLF). In analyzing the interaction between the user equipment and the network, a resulting analysis could be that parameters associated, for example, with the handover triggering event, should be changed to minimize RLF. In one example, the user equipment analyzes its interaction with the network.

In block 750, analyze internal procedures within the user equipment. In a user equipment, parameters associated with the internal procedures may be configured by the network, even though the user equipment is responsible for performing the internal procedures. In one example, the internal procedure of a cell reselection (for changing camp from the serving cell) operates on parameters configured by the network. In one aspect, at least two of the steps in blocks 730, 740 and 750 are performed in sequence to each other. In another aspect, the steps in blocks 730, 740 and 750 are performed in sequence to each other and any ordering of the three steps is equally acceptable.

Following one of the blocks 730, 740 or 750, proceed to block 760. In block 760, determine whether at least one parameter configured by the network should be changed. If no change is needed, continue with one or more of the steps in blocks 730, 740 or 750. If a change to at least one parameter is needed, proceed to block 770. In block 770, establish a communication link (e.g., a call) in a serving cell. In one aspect, the steps in blocks 730 through 770 are performed by processor B 240 (shown in FIG. 1).

Following block 770, in block 780, send a feedback message to the network with a change recommendation for the at least one parameter (e.g., a new parameter value is recommended). In one aspect, the TX data processor B 260 (shown in FIG. 1) is used to send the feedback message. In one example, the feedback message is formatted using the same RRC information element (IE) as that of the at least one parameter. Thus, there is no requirement for standardizing a new IE for this purpose. In another example, the feedback message includes extra information that would require defining a new RRC information element (IE). In one example, the feedback message from the UE is sent to the wireless network appended to one of the existing messages sent by the UE to the network. In another example, the feedback message from the UE is sent in messages dedicated to feedback reporting.

Figure 8:
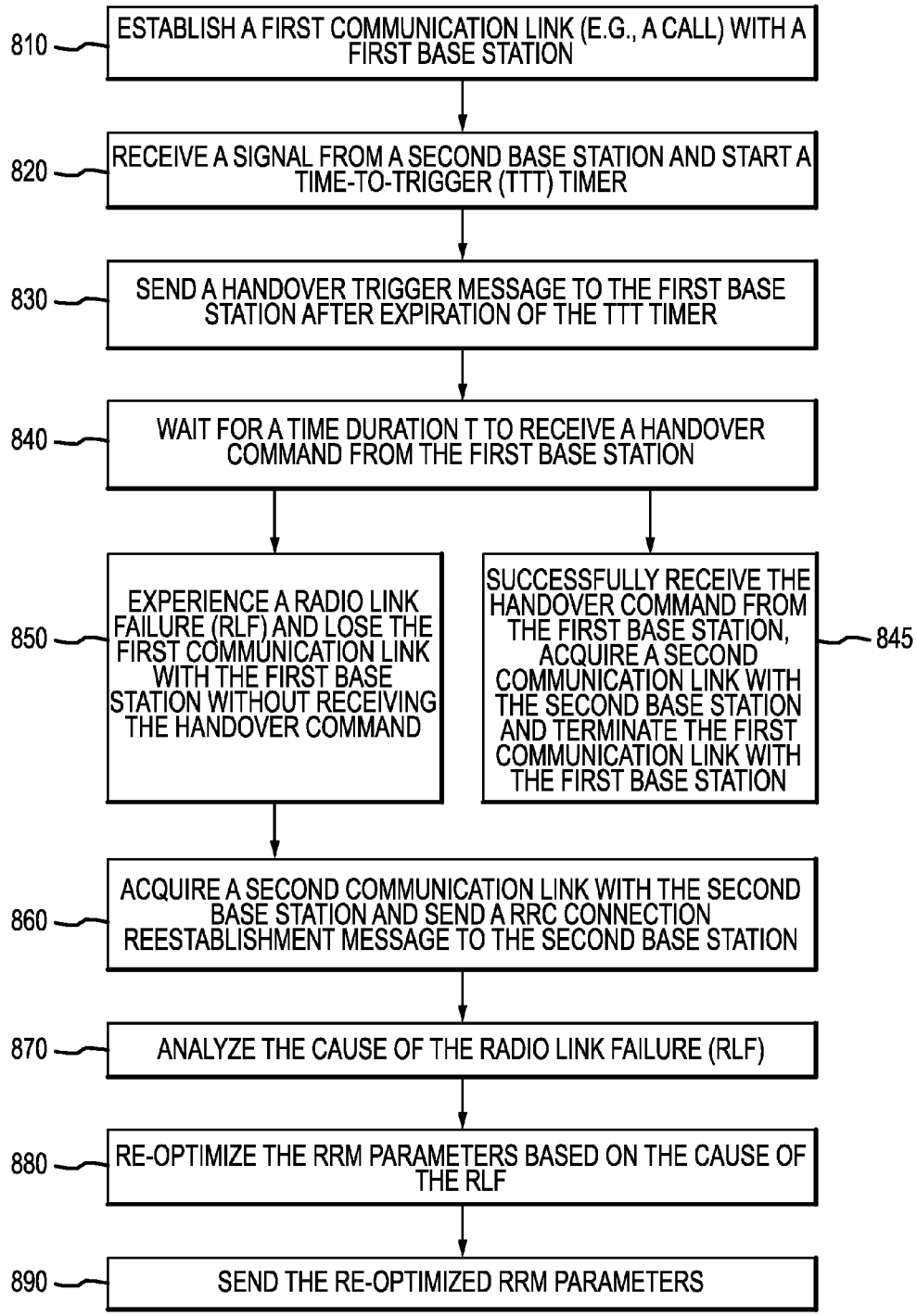
FIG. 8 is an example flow diagram optimizing feedback-based radio resource management (RRM) parameters for handover.

FIG. 8 is an example flow diagram optimizing feedback-based radio resource management (RRM) parameters for handover. In block 810, establish a first communication link (e.g., a call) with a first base station. In one example, the step in block 810 is performed by a user equipment (UE). In the process of establishing the first communication link, RRM parameters, including for example, intra-frequency handover parameters, are sent from the first base station to the UE. In one example the RRM parameters are sent via system information broadcast or via a dedicated signal from a radio resource controller (RRC).

Following block 810, in block 820, receive a second signal from a second base station and start a time-to-trigger (TTT) timer for handover to the second base station. In one example, the strength of the second signal is measured against a signal threshold ($Th_{signal}$) to determine whether to start the TTT timer. In one aspect, the signal threshold ($Th_{signal}$) represents one of a received signal strength indication (RSSI), a received power flux density (PFD) or a received isotropic power (RIP), etc. One skilled in the art would understand that the metrics disclosed herein for the signal threshold ($Th_{signal}$) are examples and do not exclude other metrics not mentioned herein but are equally useful. In one aspect, the first and second base stations are part of either a Universal Terrestrial Radio Access Network (UTRAN) or an Evolved Universal Terrestrial Radio Access Network (E-UTRAN).

In block 830, send a handover trigger message to the first base station after expiration of the TTT timer. In one example, the step in block 830 is performed by a user equipment (UE). For example, the handover trigger message contains a request to handover the UE to the second base station. In one aspect, the UE sends the handover trigger message only if a first signal in the first communication link with the first base station has degraded below a degradation threshold ($Th_{degrade}$). In one aspect, the degradation threshold ($Th_{degrade}$) represents one of a received signal strength indication (RSSI), a received power flux density (PFD) or a received isotropic power (RIP), etc. One skilled in the art would understand that the metrics disclosed herein for the degradation threshold ($Th_{degrade}$) are examples and do not exclude other metrics not mentioned herein but are equally useful.

Following block 830, in block 840, wait for a time duration T to receive a handover command from the first base station. In one example, the time duration T is set by the first base station and is part of the RRM parameters. One skilled in the art would understand that the time duration T is not limited to a particular value and that the value of the time duration may be fixed or may vary depending on system design and/or operator choice. Following block 840, proceed to either block 845 or block 850 depending on whether a handover command is received or a radio link failure is experienced.

In block 845, successfully receive the handover command from the first base station, acquire a second communication link with the second base station and terminate the first communication link with the first base station.

In block 850, experience a radio link failure (RLF) and lose the first communication link with the first base station without receiving the handover command from the first base station. In this example, the call is dropped. Following block 850, in block 860, acquire a second communication link with the second base station and send a RRC connection re-establishment message to the second base station. Following block 860, in block 870, analyze the cause of the radio link failure (RLF).

Following block 870, in block 880, re-optimize the RRM parameters including, for example, the handover parameters such as TTT timing and hysteresis, based on the cause of the RLF. In one aspect, the re-optimized RRM parameters comprise at least one of the following: a) random access channel (RACH) parameters (e.g., preamble count and/or power increments); b) cell reselection parameters (e.g., reselection time such as T_reselection and/or individual cell offsets) for obtaining optimal tradeoffs between the number of reselection ping-pongs, LAU/RAU, battery life and serving cell quality; or c) radio resource control (RRC) timing parameters (e.g., N300 and/or T300).

A goal for re-optimizing the RRM parameters is to reduce the probability of future RLF. RRM parameters may be optimized by using a pre-programmed algorithm which may take into account one or more of the following: the RF environment, UE mobility pattern, service type (e.g., more weight is given to feedback of voice users), radio access bearer (RAB) type (e.g., more weight is given to streaming signal than background signals), time of day/week or available network resources, etc. One skilled in the art would understand that various known or proprietary algorithms can be used for re-optimizing the RRM parameters without affecting the spirit or scope of the present disclosure.

Following 880, in block 890, send the re-optimized RRM parameters, for example, to the second base station, to the first base station, to a network, etc. In one example, the functionality for receiving and using the re-optimized RRM parameters resides in one of the following: Radio Network Controller (RNC)/e-Node B, network element manager, domain manager, network manager or self-organizing network (SON) server.

In one aspect, the steps of blocks 810 through 890 are performed by a user equipment (UE). There are various alternative ways for sending the re-optimized RRM parameters. The UE can use a RRC protocol to send the re-optimized RRM parameters, for example via a MEASUREMENT REPORT message to the Radio Network Controller (RNC), the first base station (i.e., e-Node B#1) or the second base station (i.e., e-Node B#2) during the next visit to the cell. Alternatively, the UE can use higher layer protocol messages to send the re-optimized RRM parameters. For example, the higher layer protocol messages are at the application layer or are part of a dedicated RAB (radio access bearer) signal for network self-optimization.

A variety of formats can be used for sending the re-optimized RRM parameters. In one example, the feedback is formatted using the same RRC information element (IE) as used for parameter configuration. For example, in 3GPP intra-frequency handover parameter optimization, the IE for "intra-frequency measurement reporting criteria" is reused for the parameter feedback, which would not require standardizing a new IE for this purpose. In another example, the UE adds extra information in the parameter feedback such as the time of day, location of the failures that triggered the feedback, etc. And, this option would require defining new IEs. In one example, feedback from the UE is sent to the wireless network appended to one of the existing messages sent by the UE to the network. In another example, feedback from the UE is sent in messages dedicated to feedback reporting.

In one example, the re-optimized RRM parameters are used, for example by the network, to fine tune settings of RRM parameters (e.g., according to user prioritization, service prioritization, etc.) for a cell to which the UE belongs. In one example, the network collects feedback of re-optimized RRM parameters from more than one UE in the cell.

One skilled in the art would understand that the steps disclosed in the example flow diagram in FIG. 8 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 9:
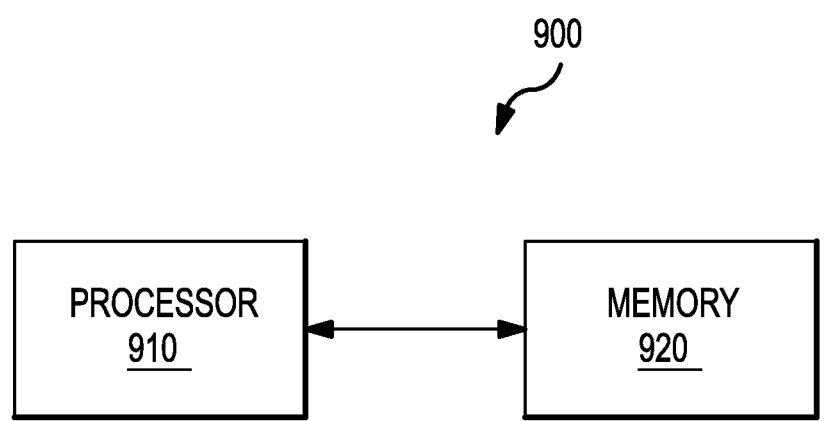
FIG. 9 illustrates an example of a device comprising a processor in communication with a memory for executing the processes for optimizing feedback-based radio resource management (RRM) parameters.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 9 illustrates an example of a device 900 comprising a processor 910 in communication with a memory 920 for executing the processes for optimizing feedback-based radio resource management (RRM) parameters. In one example, the device 900 is used to implement the algorithm illustrated in FIG. 8. In one aspect, the memory 920 is located within the processor 910. In another aspect, the memory 920 is external to the processor 910. In one aspect, the processor includes circuitry for implementing or performing the various flow diagrams, logical blocks and/or modules described herein.

Figure 10:
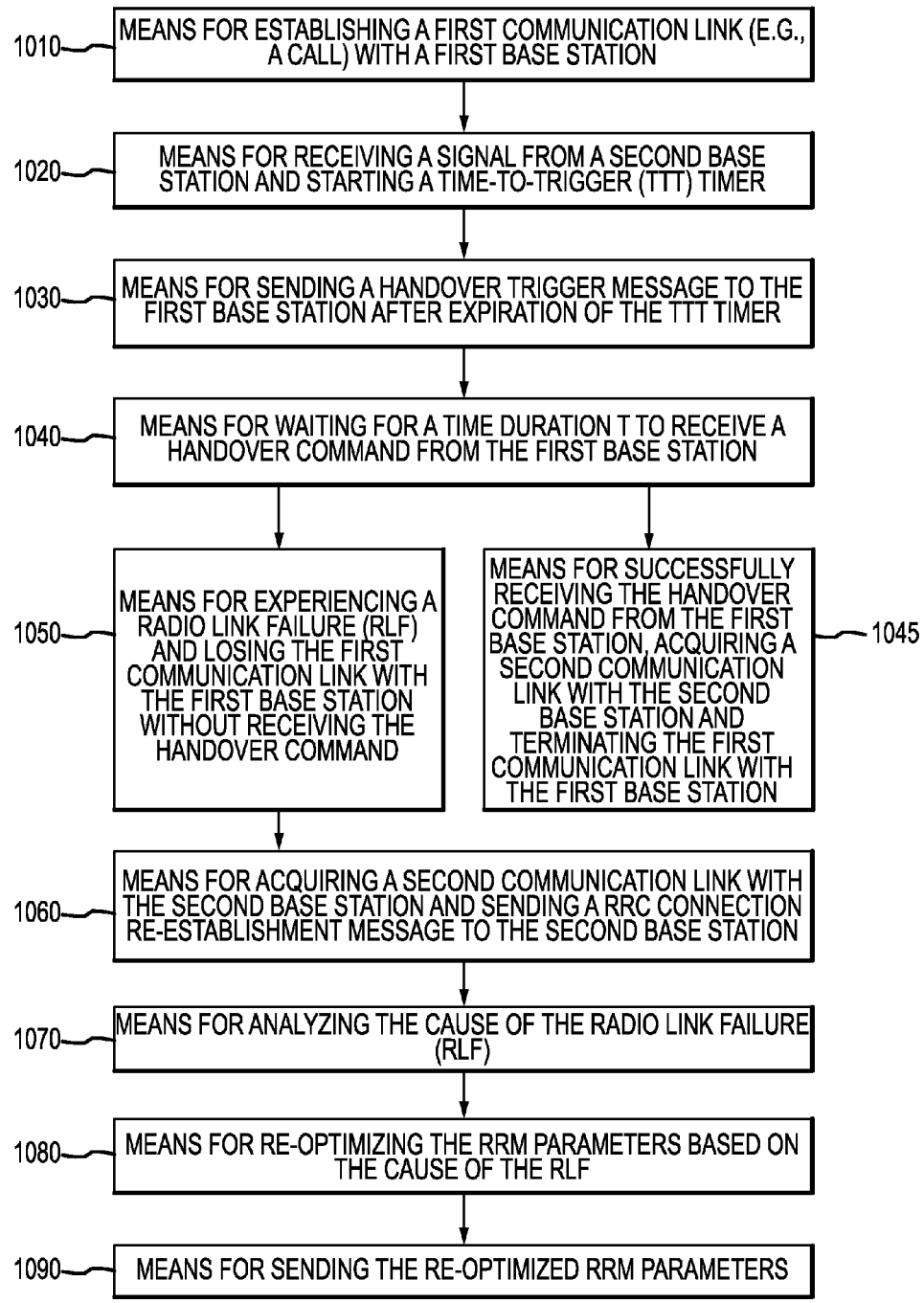
FIG. 10 illustrates an example of a device suitable for optimizing feedback-based radio resource management (RRM) parameters.

FIG. 10 illustrates an example of a device 1000 suitable for optimizing feedback-based radio resource management (RRM) parameters. In one aspect, the device 500 is implemented by at least one processor comprising one or more modules configured to provide different aspects of optimizing feedback-based radio resource management (RRM) parameters as described herein in blocks 1010, 1020, 1030, 1040, 1045, 1050, 1060, 1070, 1080 and 1090. For example, each module comprises hardware, firmware, software, or any combination thereof. In one aspect, the device 500 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for optimizing feedback-based radio resource management (RRM) parameters, comprising:
    establishing a communication link in a serving cell within a network;
    performing at least one of the following:
        a) processing a plurality of measurements received to determine viability of the serving cell and a neighboring cell, wherein the viability determination is associated with at least one RRM parameter configured by the network;
        b) analyzing an interaction between a user equipment and the network, wherein at least one RRM parameter associated with the interaction is configured by the network; or
        c) analyzing an internal procedure performed within the user equipment, wherein at least one RRM parameter of the internal procedure is configured by the network;
    determining to change the at least one RRM parameter configured by the network;
    sending a feedback message from the user equipment to the network with a change recommendation for the at least one RRM parameter, wherein the feedback message and associated change recommendation are assigned a weight in accordance with a radio bearer type; and
    adjusting the at least one RRM parameter at the user equipment in response to RRM parameter configuration information received from the network, wherein the RRM parameter configuration information is determined based on feedback messages, including (1) the sent feedback message, (2) RRM parameter change recommendations, including the associated change recommendation, and (3) weights assigned to the feedback messages and associated RRM parameter change recommendations, including the weight, received from a plurality of user equipments and the user equipment associated with the serving cell or another cell of the network.

2. The method of claim 1 further comprising receiving the plurality of measurements comprising at least one measurement emanating from the serving cell and at least one measurement emanating from the neighboring cell.

3. The method of claim 1 wherein the feedback message is formatted using a same communication protocol information element (IE) as that used by the network to configure the at least one RRM parameter.

4. The method of claim 1 wherein the feedback message is formatted using a new communication protocol information element (IE).

5. The method of claim 1 wherein the at least one RRM parameter is one of the following: handover parameters, random access channel parameters, cell reselection parameters, transmit power of at least one common channel transmitted by at least one network transmitter or radio resource control (RRC) timers and constants.

6. The method of claim 1 wherein the at least one RRM parameter is of a network area.

7. The method of claim 1 wherein the feedback message is sent to the network in one of the following scenarios: during a next visit to the serving cell; when connection to the network is re-established; at a periodic time interval; when requested by the network; or as soon as the feedback message is available.

8. A user equipment for optimizing feedback-based radio resource management (RRM) parameters, comprising:
    a processor;
    a memory containing program code executable by the processor for performing the following:
    i) establishing a communication link in a serving cell within a network;
    ii) performing at least one of the following:
        a) processing a plurality of measurements received to determine viability of the serving cell and a neighboring cell, wherein the viability determination is associated with at least one parameter configured by the network;

b) analyzing an interaction between the user equipment and the network, wherein at least one RRM parameter associated with the interaction is configured by the network; or c) analyzing an internal procedure performed within the user equipment, wherein at least one RRM parameter of the internal procedure is configured by the network;

iii) determining to change the at least one RRM parameter configured by the network;

a transmit data processor for sending a feedback message from the user equipment to the network with a change recommendation for the at least one RRM parameter, wherein the feedback message and associated change recommendation are assigned a weight in accordance with a radio bearer type, wherein the processor is configured to adjust the at least one RRM parameter at the user equipment in response to RRM parameter configuration information received from the network, wherein the RRM parameter configuration information is determined based on feedback messages, including (1) the sent feedback message, (2) RRM parameter change recommendations, including the associated change recommendation, and (3) weights assigned to the feedback messages and associated RRM parameter change recommendations, including the weight, received from a plurality of user equipments and the user equipment associated with the serving cell or another cell of the network.

9. The user equipment of claim 8 wherein the at least one RRM parameter is one of the following: handover parameters, random access channel parameters, cell reselection parameters, transmit power of at least one common channel transmitted by at least one network transmitter or radio resource control (RRC) timers and constants.

10. A non-transitory computer-readable medium having a computer program comprising instructions, which when executed by at least one processor, operates to optimize feedback-based radio resource management (RRM) parameters, the computer program comprising:

instructions for establishing a communication link in a serving cell within a network; instructions for performing at least one of the following:

a) processing a plurality of measurements received to determine viability of the serving cell and a neighboring cell, wherein the viability determination is associated with at least one RRM parameter configured by the network;

b) analyzing an interaction between a user equipment and the network, wherein at least one RRM parameter associated with the interaction is configured by the network; or c) analyzing an internal procedure performed within the user equipment, wherein at least one RRM parameter of the internal procedure is configured by the network;

instructions for determining to change the at least one RRM parameter configured by the network;

instructions for sending a feedback message from the user equipment to the network with a change recommendation for the at least one RRM parameter, wherein the feedback message and associated change recommendation are assigned a weight in accordance with a radio bearer type; and instructions for adjusting the at least one RRM parameter at the user equipment in response to RRM parameter configuration information received from the network, wherein the RRM parameter configuration information is determined based on feedback messages, including the sent feedback message, (2) RRM parameter change recommendations, including the associated change recommendation, and (3) weights assigned to the feedback messages and associated RRM parameter change recommendations, including the weight, received from a plurality of user equipments and the user equipment associated with the serving cell or another cell of the network.

11. A method for optimizing one or more feedback-based radio resource management (RRM) parameters, comprising:

acquiring a second communication link with a second base station when a second signal strength received from the second base station is greater than a first signal strength received from a first base station, after experiencing a radio link failure (RLF) that causes losing a first communication link with the first base station;

analyzing, by a user equipment following the acquiring the second communication link, a cause of the RLF;

re-optimizing, by the user equipment, the one or more RRM parameters based on the cause of the RLF;

sending the re-optimized one or more RRM parameters; and adjusting the one or more RRM parameters at the user equipment in response to received RRM parameter configuration information, wherein the RRM parameter configuration information is determined based on a plurality of re-optimized one or more RRM parameters received from a plurality of user equipments associated with a cell.

12. The method of claim 11, wherein the re-optimized one or more RRM parameters are sent to one or more of the following: the first base station, the second base station, a communication network, a radio network controller (RNC), a network element manager, a domain manager, a network manager or a self-organizing network (SON) server.

13. The method of claim 11, wherein the re-optimized one or more RRM parameters comprise time-to-trigger (TTT) parameters and hysteresis values used for handover of the user equipment.

14. The method of claim 13, wherein the re-optimizing is further based on one or more of the following: the RF environment, UE mobility pattern, service type, radio access bearer (RAB) type, time of day or week or available network resources.

15. The method of claim 14, wherein the re-optimized one or more RRM parameters are sent to: a) a radio network controller (RNC), the first base station or the second base station using a radio resource controller (RRC) protocol; b) to a core network using a higher layer protocol; or c) a network management system using a management layer protocol.

16. The method of claim 15 wherein the first and second base stations are part of either a Universal Terrestrial Radio Access Network (UTRAN) or an Evolved Universal Terrestrial Radio Access Network (E-UTRAN).

17. The method of claim 11 wherein the re-optimized one or more RRM parameters comprise at least one of the following: handover parameters, random access channel parameters, cell reselection parameters, transmit power of at least one common channel transmitted by at least one network transmitter or radio resource control (RRC) timers and constants.

18. A user equipment for optimizing one or more feedback-based radio resource management (RRM) parameters comprising a processor and a memory, the memory containing program code executable by the processor for performing the following:

acquiring a second communication link with a second base station when a second signal strength received from the second base station is greater than a first signal strength received from a first base station, after experiencing a radio link failure (RLF) that causes losing a first communication link with the first base station;

analyzing, following the acquiring the second communication link, a cause of the RLF;

re-optimizing the one or more RRM parameters based on the cause of the RLF;

sending the re-optimized one or more RRM parameters; and adjusting the one or more RRM parameters at the user equipment in response to received RRM parameter configuration information, wherein the RRM parameter configuration information is determined based on a plurality of re-optimized one or more RRM parameters received from a plurality of user equipments associated with a cell.

19. The user equipment of claim 18, wherein the re-optimized one or more RRM parameters are sent to one or more of the following: the first base station, the second base station, a communication network, a radio network controller (RNC), a network element manager, a domain manager, a network manager or a self-organizing network (SON) server.

20. The user equipment of claim 18, wherein the re-optimized one or more RRM parameters comprise time-to-trigger (TTT) parameters and hysteresis values used for handover of the user equipment.

21. The user equipment of claim 20, wherein the re-optimizing is further based on one or more of the following: the RF environment, UE mobility pattern, service type, radio access bearer (RAB) type, time of day or week or available network resources.

22. The user equipment of claim 21, wherein the re-optimized one or more RRM parameters are sent to a) a radio network controller (RNC), the first base station or the second base station using a radio resource controller (RRC) protocol; b) a core network using a higher layer protocol; or c) a network management system using a management layer protocol.

23. The user equipment of claim 22 wherein the first and second base stations are part of either a Universal Terrestrial Radio Access Network (UTRAN) or an Evolved Universal Terrestrial Radio Access Network (E-UTRAN).

24. The user equipment of claim 18 wherein the re-optimized one or more RRM parameters comprise at least one of the following: handover parameters, random access channel parameters, cell reselection parameters, transmit power of at least one common channel transmitted by at least one network transmitter or radio resource control (RRC) timers and constants.

25. A non-transitory computer-readable medium having a computer program comprising instructions, which when executed by at least one processor, operates to optimize feedback-based radio resource management (RRM) parameters, the computer program comprising:

instructions for acquiring a second communication link with a second base station when a second signal strength received from the second base station is greater than a first signal strength received from a first base station, after experiencing a radio link failure (RLF) that causes losing a first communication link with the first base station;

instructions for analyzing, following the acquiring the second communication link, a cause of the RLF;

instructions for re-optimizing the RRM parameters based on the cause of the RLF;

instructions for sending the re-optimized one or more RRM parameters; and instructions for adjusting the one or more RRM parameters at the user equipment in response to received RRM parameter configuration information, wherein the RRM parameter configuration information is determined based on a plurality of re-optimized one or more RRM parameters received from a plurality of user equipments associated with a cell.

26. An apparatus for optimizing feedback-based radio resource management (RRM) parameters, comprising:

means for establishing a communication link in a serving cell within a network;

means for performing at least one of the following:
  a) means for processing a plurality of measurements received to determine viability of the servicing cell and a neighboring cell, wherein the viability determination is associated with at least one RRM parameter configured by the network;
  b) means for analyzing an interaction between a user equipment and the network, wherein at least one RRM parameter associated with the interaction is configured by the network; or
  c) means for analyzing an internal procedure performed within the user equipment, wherein at least one RRM parameter of the internal procedure is configured by the network;

means for determining to change the at least one RRM parameter configured by the network;

means for sending a feedback message from the user equipment to the network with a change recommendation for the at least one RRM parameter, wherein the feedback message and associated change recommendation are assigned a weight in accordance with a radio bearer type; and means for adjusting the at least one RRM parameter at the user equipment in response to RRM parameter configuration information received from the network, wherein the RRM parameter configuration information is determined based on feedback messages, including (1) the sent feedback message, (2) RRM parameter change recommendations, including the associated change recommendation, and (3) weights assigned to the feedback messages and associated RRM parameter change recommendations, including the weight, received from a plurality of user equipments and the user equipment associated with the serving cell or another cell of the network.

27. An apparatus for optimizing one or more feedback-based radio resource management (RRM) parameters, comprising:

means for acquiring a second communication link with a second base station when a second signal strength received from the second base station is greater than a first signal strength received from a first base station, after experiencing a radio link failure (RLF) that causes losing a first communication link with the first base station;

means for analyzing, following the acquiring the second communication link, a cause of the RLF;

means for re-optimizing the one or more RRM parameters based on the cause of the RLF;

means for sending the re-optimized one or more RRM parameters; and means for adjusting the one or more RRM parameters at the user equipment in response to received RRM parameter configuration information, wherein the RRM parameter configuration information is determined based on a plurality of re-optimized one or more RRM parameters received from a plurality of user equipments associated with a cell.

\* \* \* \* \*